US011227355B2

(12) United States Patent
Tagami et al.

(10) Patent No.: US 11,227,355 B2
(45) Date of Patent: Jan. 18, 2022

(54) INFORMATION PROCESSING APPARATUS, METHOD, AND COMPUTER-READABLE MEDIUM

(71) Applicant: Sony Corporation, Tokyo (JP)

(72) Inventors: Naoki Tagami, Tokyo (JP); Shigeatsu Yoshioka, Tokyo (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 16/107,042

(22) Filed: Aug. 21, 2018

(65) Prior Publication Data

US 2018/0357738 A1 Dec. 13, 2018

Related U.S. Application Data

(63) Continuation of application No. 12/939,603, filed on Nov. 4, 2010, now Pat. No. 10,078,876.

(51) Int. Cl.
*G06T 1/00* (2006.01)
(52) U.S. Cl.
CPC ..................... *G06T 1/00* (2013.01)
(58) Field of Classification Search
CPC ......... G06F 19/321; G06F 19/32; G06F 19/34
See application file for complete search history.

(56) References Cited

U.S. PATENT DOCUMENTS

| | | | | |
|---|---|---|---|---|
| 5,689,717 A | * | 11/1997 | Pritt | G06T 11/00 345/619 |
| 5,740,801 A | | 4/1998 | Branson | |
| 5,832,474 A | * | 11/1998 | Lopresti | G06F 16/93 |
| 6,031,930 A | | 2/2000 | Bacus et al. | |
| 6,101,265 A | | 8/2000 | Bacus et al. | |
| 6,226,392 B1 | | 5/2001 | Bacus et al. | |
| 6,272,235 B1 | | 8/2001 | Bacus et al. | |
| 6,339,431 B1 | * | 1/2002 | Ohmori | G06F 3/0481 345/585 |
| 6,396,941 B1 | | 5/2002 | Bacus et al. | |
| 6,404,906 B2 | | 6/2002 | Bacus et al. | |
| 6,522,774 B1 | | 2/2003 | Bacus et al. | |

(Continued)

FOREIGN PATENT DOCUMENTS

| | | |
|---|---|---|
| JP | 11-353327 | 12/1999 |
| JP | 2000-324388 | 11/2000 |

(Continued)

OTHER PUBLICATIONS

European Search Report for 10014379.1-2218 dated May 20, 2011.

(Continued)

*Primary Examiner* — Justin S Lee
(74) *Attorney, Agent, or Firm* — K&L Gates LLP

(57) ABSTRACT

In one example embodiment, an information processing apparatus generates and causes a display device to display a first thumbnail image which is associated with annotation information. Using a size of the first thumbnail image, the information processing apparatus determines a display size of a first annotation which corresponds to the annotation information. Using the determined display size, the information processing apparatus determines a second annotation. In one example embodiment, the information processing apparatus causes a display device to display the determined second annotation overlapping the first thumbnail image.

17 Claims, 10 Drawing Sheets

(56) References Cited

U.S. PATENT DOCUMENTS

| | | | |
|---|---|---|---|
| 6,674,881 B2 | 1/2004 | Bacus et al. | |
| 6,674,884 B2 | 1/2004 | Bacus et al. | |
| 6,775,402 B2 | 8/2004 | Bacus et al. | |
| 7,110,586 B2 | 9/2006 | Bacus et al. | |
| 7,146,372 B2 | 12/2006 | Bacus et al. | |
| 7,149,332 B2 | 12/2006 | Bacus et al. | |
| 7,542,596 B2 | 6/2009 | Bacus et al. | |
| 7,738,688 B2 | 6/2010 | Eichhorn et al. | |
| 7,856,131 B2 | 12/2010 | Bacus et al. | |
| 8,352,465 B1* | 1/2013 | Jing | G06F 16/54 707/723 |
| 2002/0000998 A1* | 1/2002 | Scott | G06T 3/4084 345/667 |
| 2002/0059293 A1* | 5/2002 | Hirsch | G06F 16/289 |
| 2003/0070139 A1* | 4/2003 | Marshall | G06F 40/169 715/231 |
| 2004/0167806 A1 | 8/2004 | Eichhorn et al. | |
| 2004/0194021 A1* | 9/2004 | Marshall | G06F 40/169 715/232 |
| 2005/0254696 A1* | 11/2005 | Bacus | G06K 9/00127 382/128 |
| 2006/0271870 A1* | 11/2006 | Anwar | G06F 3/0481 715/764 |
| 2007/0110338 A1* | 5/2007 | Snavely | G06K 9/32 382/305 |
| 2007/0156672 A1* | 7/2007 | Wolff | G06F 16/958 |
| 2007/0242069 A1* | 10/2007 | Matsue | G06F 19/321 345/428 |
| 2008/0111822 A1* | 5/2008 | Horowitz | H04N 21/4884 345/530 |
| 2008/0180460 A1* | 7/2008 | Ford | G06F 30/00 345/661 |
| 2008/0232698 A1* | 9/2008 | Shi | G06K 9/00248 382/225 |
| 2009/0074232 A1* | 3/2009 | Yamashita | H04N 1/3871 382/100 |
| 2010/0023851 A1* | 1/2010 | Schormann | G06Q 10/10 715/232 |
| 2010/0073543 A1* | 3/2010 | Takano | H04N 5/232 348/333.01 |
| 2010/0135562 A1* | 6/2010 | Greenberg | G06F 19/321 382/131 |

FOREIGN PATENT DOCUMENTS

| | | |
|---|---|---|
| JP | 2005-110878 | 4/2005 |
| JP | 2006-108936 | 4/2006 |
| JP | 2006519443 | 8/2006 |
| JP | 2008-140361 | 6/2008 |
| JP | 2009037250 | 2/2009 |

OTHER PUBLICATIONS

Photomesa 3.1.2. (Windows) 2006, XP002622844, retrieved from Internet: URL:http://www.windsorinterfaces.com/photomesda. shtml, retrieved on Feb. 15, 2011.

Quasi-Hierarchical, Interactive Navigation of Images and Meta-Data in the Open Microscopy Environment: Harry Hochheiser and Ilya G. Goldberg: Biomedical Imaging: Macro to Nano, 2006, 3rd IEEE International Symposium on Apr. 6, 2006, Piscataway, NJ, USA, pp. 1272-1275, XP010912785, DOI: DOI:10.1109/ISBI.2006. 1625157; ISBN 978-0-7803-9576-3 *section 7, last paragraph*.

Image-Browser Taxonomy and Guidelines for Designers, Catherine Plaisant, David Carr, and Ben Shneiderman, University of Maryland, IEEE Software USA, vol. 12, No. 2, Mar. 1995, ISSN: 0740-7459 *figure 8 and related text passages*.

Japanese Patent Office, Office Action issued in connection with Japanese Patent Application Serial No. 2009-272713, dated Nov. 26, 2013. (4 pages).

Chinese Office Action issued in connection with Chinese Appl. No. 201010557333.6, dated Apr. 22, 2016.

Decision to Refuse a European Patent Application dated Nov. 21, 2016 for Application No. 10 014 379.1.

* cited by examiner

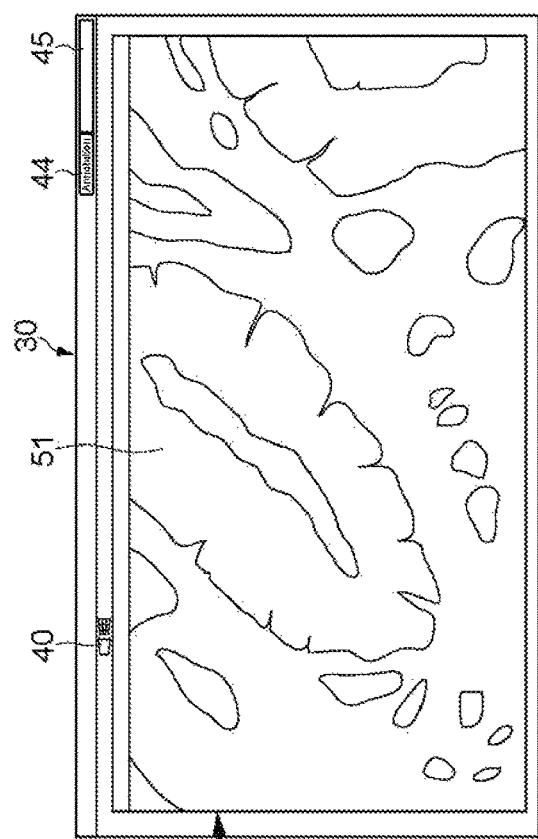
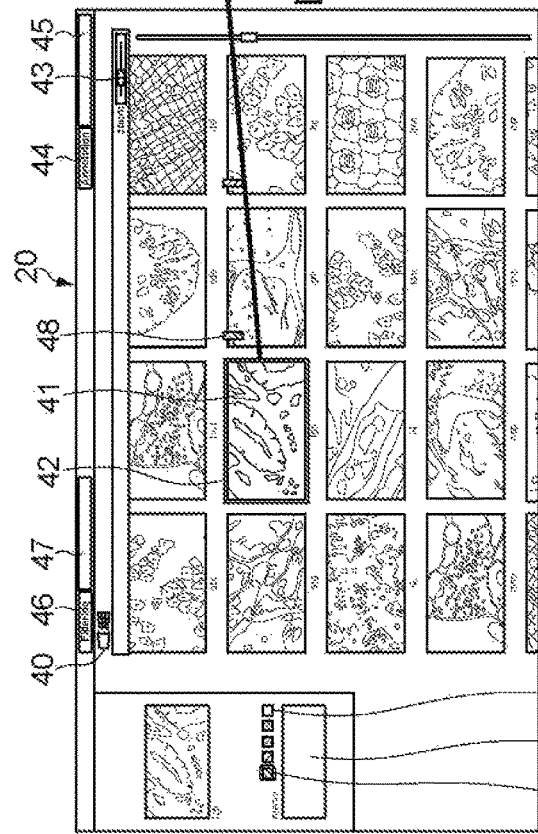
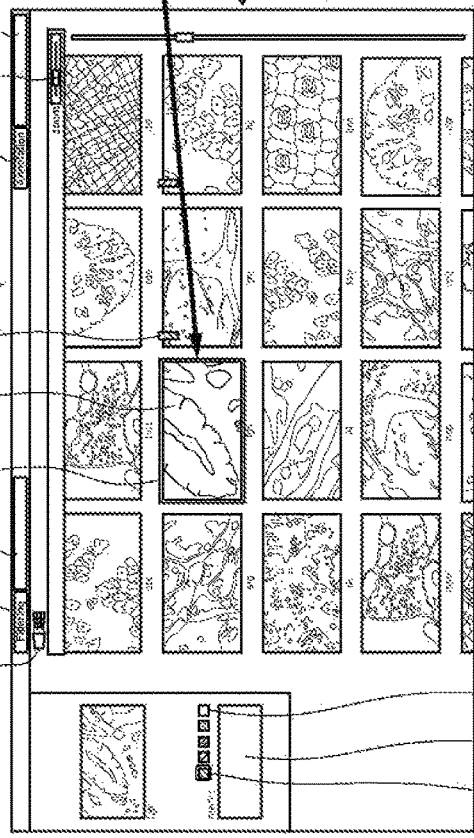
FIG.10A  FIG.10B  FIG.10C  FIG.10D

INFORMATION PROCESSING APPARATUS, METHOD, AND COMPUTER-READABLE MEDIUM

CROSS REFERENCE TO RELATED APPLICATION

The present application is a continuation based on U.S. application Ser. No. 12/939,603, filed on Nov. 4, 2010 which claims priority to Japanese Patent Application No. JP 2009-272713, filed in the Japanese Patent Office on Nov. 30, 2009, the entire contents of which is being incorporated herein by reference.

BACKGROUND

In a field of medicine, pathology, or the like, there has been proposed a system that digitizes an image of a cell, a tissue, an organ, or the like of a living body, that is obtained by an optical microscope, to examine the tissue or the like by a doctor or a pathologist or diagnose a patient based on the digitized image.

For example, Japanese Patent Application Laid-open No. 2009-37250 (hereinafter, referred to as Patent Document 1) discloses a method in which an image optically obtained by a microscope is digitized by a video camera with a CCD (charge coupled device), a digital signal is input to a control computer system, and the image is visualized on a monitor. A pathologist performs examination while watching the image displayed on the monitor (see, for example, paragraphs [0027] and [0028] and FIG. 5 of Patent Document 1). Such a system is generally referred to as a "virtual microscope".

Further, some virtual microscope systems are capable of displaying lists of thumbnail images, which are reduced-size images of original images (see, for example, paragraph [0053] and FIG. 5G of Japanese Patent Application Laid-open No. 2006-519443) (hereinafter, referred to as Patent Document 2). A user can select an image to which the user pays attention based on the list of the thumbnail images, to be displayed.

Meanwhile, in a case of displaying images for especially pathological diagnosis, in many cases, shapes of slide specimens from which the images are obtained are similar to one another, and original images are obtained from slides stained in a similar manner. Therefore, at the time of displaying the list of thumbnail images, in a case where the thumbnail images are reduced in size, a larger number of thumbnail images can be displayed on a list. However, in a case where the thumbnail images are too much reduced in size, a user cannot recognize the thumbnail images from one another.

Further, in a case where the size of the thumbnail image is smaller, a user cannot recognize a portion in the thumbnail image in which the user is interested. Specifically, in the field of pathological diagnosis, although the size of the original image is extremely large (several tens of Kpixel× several tens of Kpixel), an area having pathological characteristics in which a user such as a pathologist is interested is sometimes extremely smaller than the original image (for example, several thousands of pixel×several thousands of pixel).

Therefore, displaying a larger number of thumbnail images on a list and visibility is in a relationship of trade-off. So it is required that thumbnail images be resizable as necessary.

Meanwhile, some virtual microscope systems have an annotation function. In the annotation function, with regard to a portion in which a user is interested, for example, a portion which may have a disorder, position information and metadata such as character information are input, and the position information and the metadata such as character information are displayed on an original image in an overlapped manner. By applying the annotation function to the list of thumbnail images, even if the size of the thumbnail images is small, a user can recognize the portion in which a user is interested.

However, in the case where the position information and the character information are displayed on the list of thumbnail images through the annotation function, too much information is displayed on a display screen, and visibility of each thumbnail image may be adversely affected. In such a case, the intended purpose of a list of thumbnail images, that is, selection of a desired thumbnail image by a user, cannot be achieved.

In view of the above-mentioned circumstances, it is desirable to provide an information processing apparatus, an information processing method, and a program therefor capable of resizing a thumbnail image of an image obtained by a microscope and capable of changing display modes of metadata displayed together with the thumbnail image without adversely affecting visibility of the thumbnail image.

SUMMARY

The present disclosure relates to an information processing apparatus, an information processing method, and a program therefor for controlling display of an image obtained by a microscope in a field of medicine, pathology, biology, materials science, or the like.

In one example embodiment, an information processing apparatus includes a processor, and a memory device operatively coupled to the processor, the memory device storing instructions that cause the processor, in cooperation with the memory device, to: (a) generate and cause a display device to display a first thumbnail image which is associated with annotation information, the first thumbnail image having a size; (b) using the size of the first thumbnail image, determine a display size of a first annotation which corresponds to the annotation information; (c) using the determined display size, determine a second annotation; and (d) cause a display device to display the determined second annotation overlapping the first thumbnail image.

In one example embodiment, the thumbnail image is associated with a section of biological tissue.

In one example embodiment, the generated thumbnail image is selected from images observed by a microscope.

In one example embodiment, the determined second annotation is selected from a plurality of annotations which correspond to the thumbnail image.

In one example embodiment, the information processing apparatus includes an input device is operatively coupled to the processor. In one example embodiment, the instructions cause the processor to operate with the input device to enable a user to input the annotation information.

In one example embodiment, the instructions cause the processor to determine whether the determined display size of the first annotation is smaller than a threshold value. In one example embodiment, the instructions cause the processor to cause a display device to display first annotation position information overlapping the first thumbnail image in response to the determined display size of the first annotation being smaller than the threshold value. In one example embodiment, the instructions cause the processor to cause a display device to display second annotation position information and annotation character information overlapping the thumbnail image in response to the determined display size of the first annotation not being smaller than the threshold value.

In one example embodiment, the instructions cause the processor to operate with an input device to enable a user to change the size of the thumbnail image. In one example embodiment; in response to the size of the thumbnail image being changed, for the changed size of the thumbnail image, the instructions cause the processor to repeat: (i) using the changed size of the first thumbnail image, determine a display size of a first annotation which corresponds to the annotation information; (ii) using the determined display size, determine a second annotation; and (iii) cause a display device to display the determined second annotation overlapping the first thumbnail image.

In one example embodiment, the displayed first thumbnail image is associated with first annotation character information. In this example embodiment, the instructions cause the processor to generate and cause the display device to display a second thumbnail image. The second thumbnail image is associated with second annotation character information. In one example embodiment, the first thumbnail image and the second thumbnail image are generated from a plurality of thumbnail images associated with a plurality of annotation character information.

In one example embodiment, the instructions cause the processor to operate with an input device to enable a user to filter a display of the plurality of thumbnail images based on the plurality of annotation character information.

In one example embodiment, the instructions cause the processor to cause a display device to display the first thumbnail image as a slide image in response to a first request. For the displayed slide image, the instructions cause the processor to operate with an input device to enable a user to perform at least one of a zoom operation and a movement operation. In one example embodiment, in response to a second request, the instructions cause the processor to cause a display device to display the slide image as a second thumbnail image. In this example embodiment, the displayed second thumbnail image indicates the performed at least one zoom operation and movement operation.

In one example embodiment, a method of operating an information processing apparatus including instructions includes: (a) causing a processor to execute the instructions to generate a first thumbnail image which is associated with annotation information, the first thumbnail image having a size; (b) causing the processor to execute the instructions to, using the size of the first thumbnail image, determine a display size of a first annotation which corresponds to the annotation information; (c) causing the processor to execute the instructions to, using the determined display size, determine a second annotation; and (d) causing a display device to display the determined second annotation overlapping the first thumbnail image.

In one example embodiment, a computer-readable medium stores instructions structured to cause an information processing apparatus to: (a) generate and cause a display device to display a first thumbnail image which is associated with annotation information, the first thumbnail image having a size; (b) using the size of the first thumbnail image, determine a display size of a first annotation which corresponds to the annotation information; (c) using the determined display size, determine a second annotation; and (d) cause a display device to display the determined second annotation overlapping the first thumbnail image.

As described above, according to the example embodiments, it is possible to resize a thumbnail image of an image obtained by a microscope and to change display modes of metadata displayed together with the thumbnail image without adversely affecting visibility of the thumbnail image.

Additional features and advantages are described herein, and will be apparent from the following Detailed Description and the figures.

BRIEF DESCRIPTION OF THE FIGURES

FIGS. 10A, 10B, 10C and 10D are diagrams showing an example reflecting process of the operation history to the thumbnail image.

DETAILED DESCRIPTION

Hereinafter, example embodiments of the present disclosure will be described with reference to the drawings.

[Structure of an Example Information Processing Apparatus]

Figure 1:
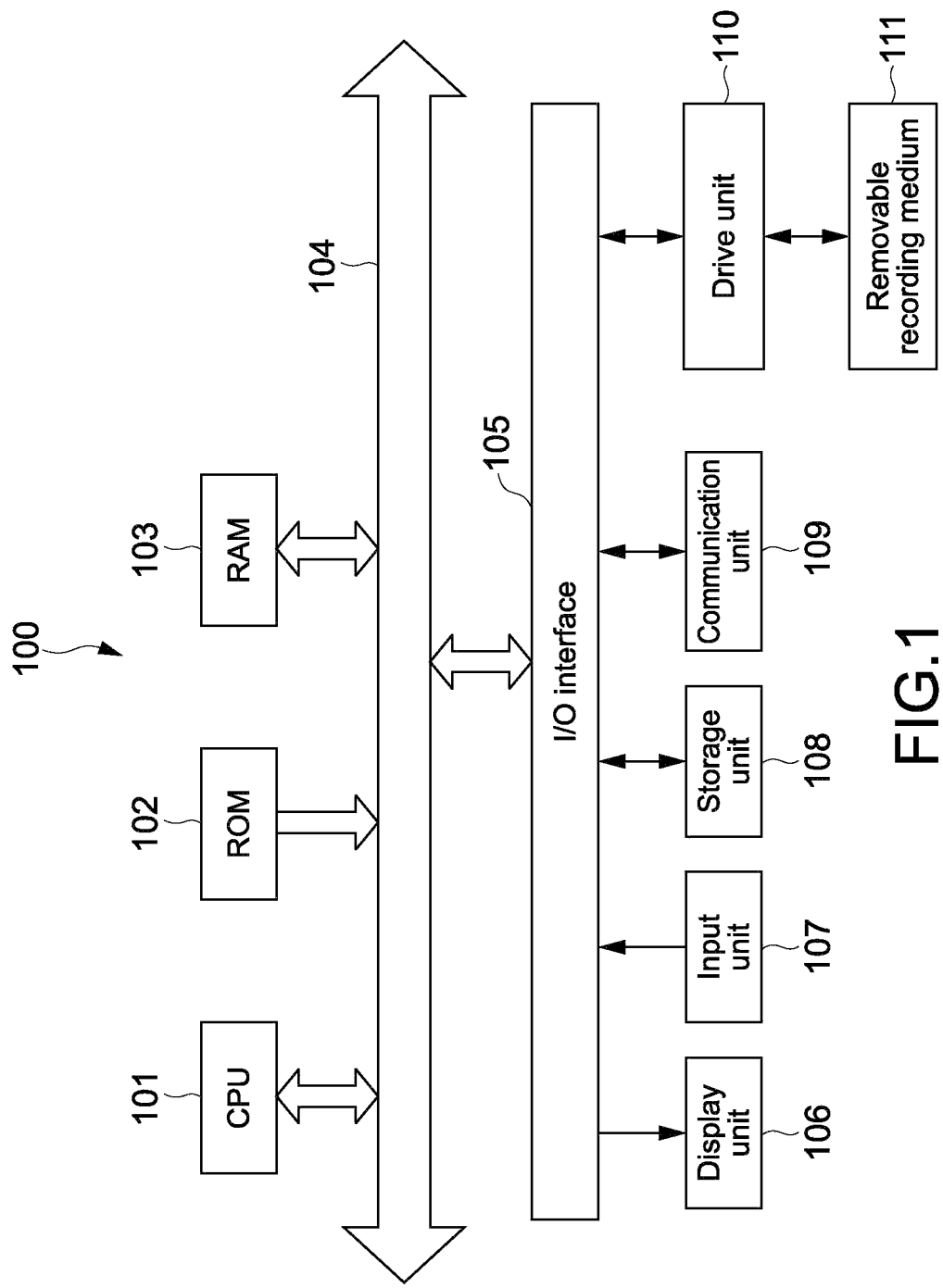
FIG. 1 is a block diagram showing the structure of an example information processing system including at least an information processing apparatus according to an example embodiment of the present disclosure.

FIG. 1 is a block diagram showing the structure of an information processing system including at least an information processing apparatus according to an example embodiment of the present disclosure. As the information processing apparatus, a PC (personal computer) 100 is used, for example.

The PC 100 includes a CPU (central processing unit) 101, a ROM (read only memory) 102, a RAM (random access memory) 103, an input and output interface (hereinafter, abbreviated as I/O interface) 105, and a bus 104 that connects those components with one another.

The CPU 101 arbitrarily accesses the RAM 103 and the like as necessary, and controls the overall blocks of the PC 100 while performing various arithmetic processing. The ROM 102 is a non-volatile memory which fixedly stores an OS executed by the CPU 101 or firmware such as a program or various parameters. The RAM 103 is used as a work area and the like of the CPU 101, and temporarily stores an OS, various running programs, and various data during processing.

To the I/O interface 105, a display unit 106, an input unit 107, a storage unit 108, a communication unit 109, a drive unit 110, and the like are connected.

The display unit 106 is a display device that uses liquid crystal, EL (electro-luminescence), a CRT (cathode ray tube), or the like. The display unit 106 may be stored in the PC 100 or may be externally connected to the PC 100.

The input unit 107 is, for example, a pointing device, a keyboard, a touch panel, or another operation apparatus. In the case where the input unit 107 includes a touch panel, the touch panel may be integrated with the display unit 106.

The storage unit 108 is a non-volatile memory such as an HDD (hard disk drive), a flash memory, and another solid-state memory. The storage unit 108 stores images obtained by an optical microscope (described later) and the like. Further, the storage unit 108 may store metadata such as annotation information and characteristic data (described later).

The drive unit 110 is a device capable of driving a removable recording medium 111 such as an optical recording medium, a floppy (registered trademark) disk, a magnetic recording tape, and a flash memory. In contrast, the storage unit 108 is often used as a device that is previously included in the PC 100 and mainly drives a recording medium that is not removable.

The communication unit 109 is a modem, a router, or another communication apparatus that is connectable to a LAN (local area network), a WAN (wide area network), or the like and is used for communicating with another device. The communication unit 109 may perform either one of a wired communication or a wireless communication. The communication unit 109 is used separately from the PC 100 in many cases.

Figure 2:
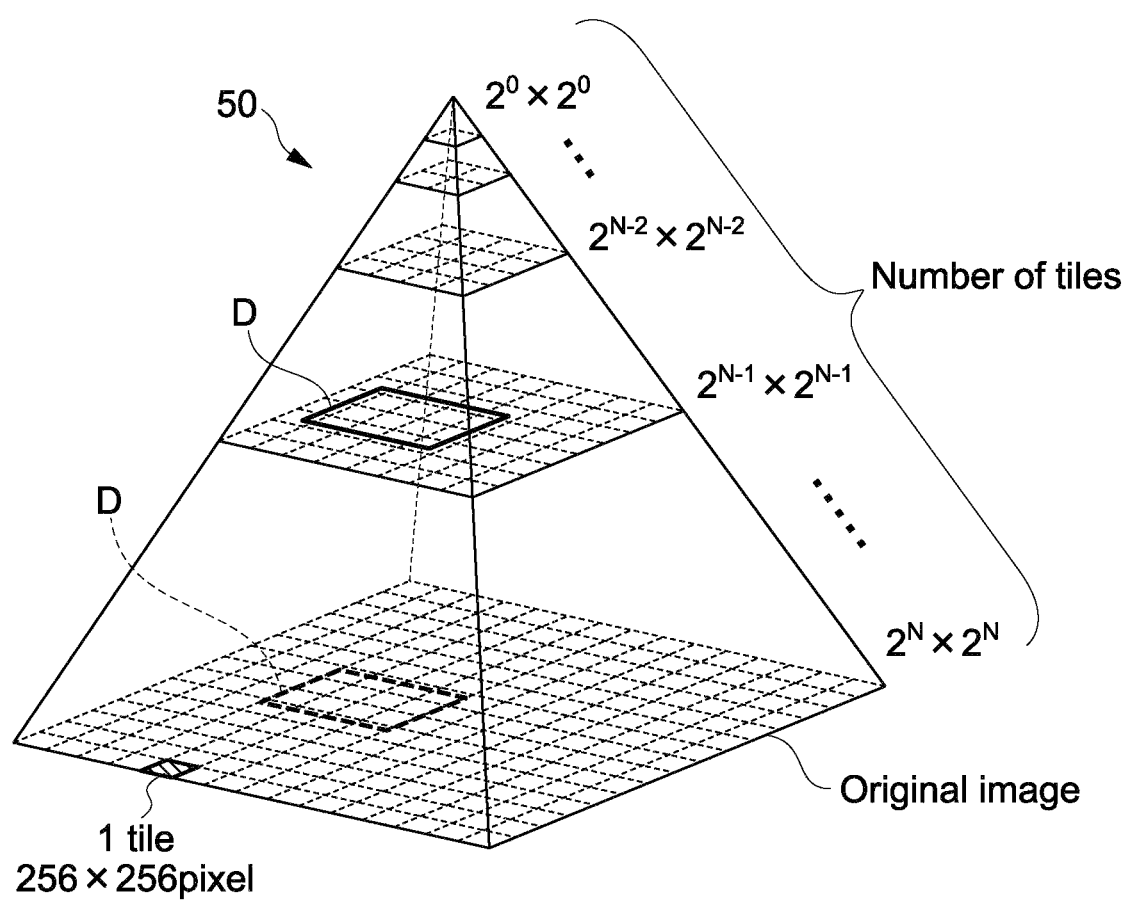
FIG. 2 is a diagram showing an example image pyramid structure for explaining the display principle according to an example embodiment of the present disclosure.

Next, a description will be given on an image that is obtained by an optical microscope (not shown) and is mainly stored in the storage unit 108 of the PC 100 and on a principle of displaying the image. FIG. 2 is a diagram showing an example image pyramid structure for explaining the display principle.

As shown in FIG. 2, images treated in this example embodiment form a pyramid structure (image pyramid structure 50). The image pyramid structure 50 is an image group generated at a plurality of resolutions with respect to one image obtained from one observation target object 15 (see, FIG. 3) by an optical microscope. In this example embodiment, each image forming the image group is referred to as a "whole image". On a lowermost part of the image pyramid structure 50, a largest whole image is disposed, and on an uppermost part thereof, a smallest whole image is disposed. A resolution of the largest whole image is 50×50 (Kpixel: kilopixel) or 40×60 (Kpixel), for example. A resolution of the smallest whole image is 256×256 (pixel) or 256×512 (pixel), for example. Each whole image is, for example, an image compressed in JPEG format, but not limited to this.

The PC 100 arbitrarily extracts an image of a portion corresponding to a predetermined display range of the display unit 106 (hereinafter, referred to as "partial image") out of each whole image included in the image pyramid structure 50, reads the partial image in the RAM 103, and outputs the partial image through the display unit 106. Here, the display range of the display unit 106 is represented by D in FIG. 2.

Figure 3:
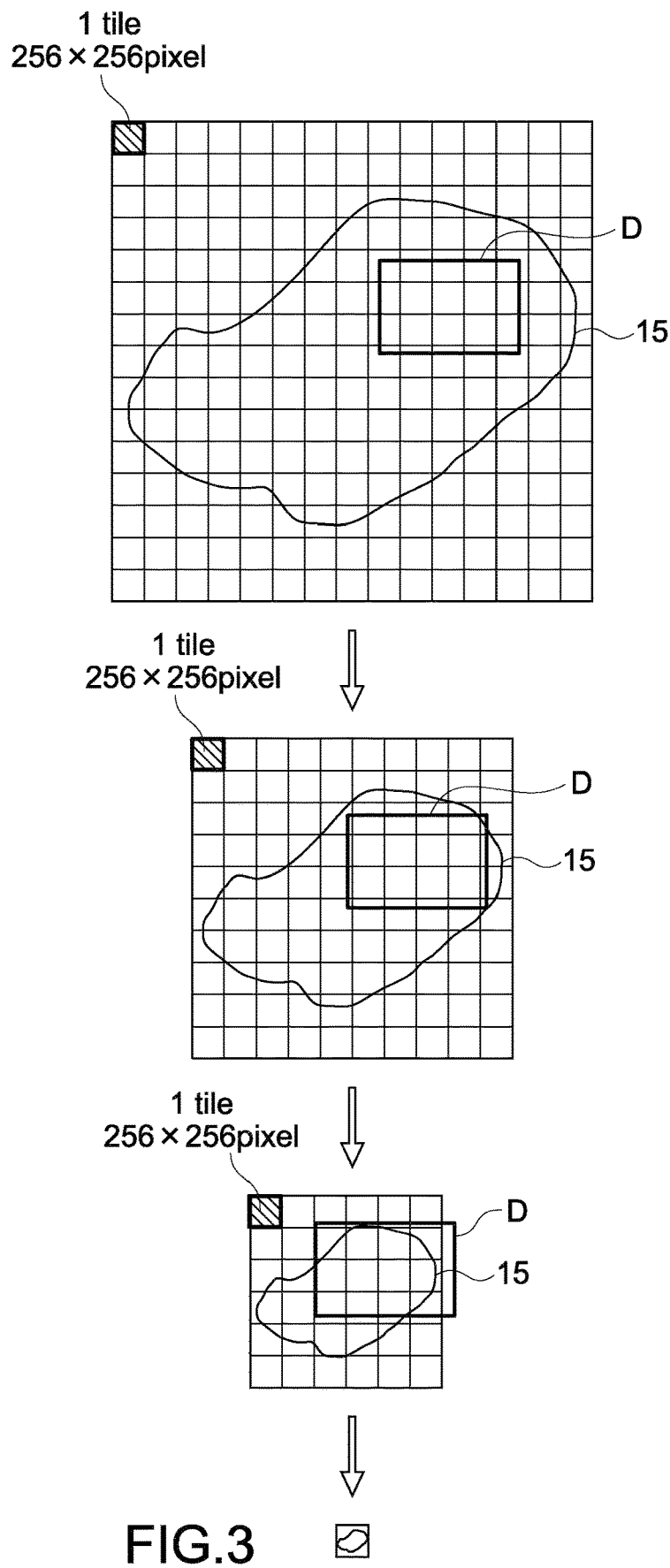
FIG. 3 is a diagram for explaining an example procedure at a time when the image group of the image pyramid structure of FIG. 2 is generated.

FIG. 3 is a diagram for explaining a procedure at a time when the image group of the image pyramid structure 50 is generated.

First, a digital image being an original image is obtained at a predetermined observation magnification by an optical microscope (not shown). The original image corresponds to the largest whole image which is the lowermost image of the image pyramid structure 50 of FIG. 2. That is, the original image is the whole image of the highest resolution. Accordingly, as the lowermost whole image of the image pyramid structure 50, an image observed at a relatively high magnification and obtained by an optical microscope is used.

Note that, in the field of pathology, generally, a matter obtained by slicing an organ, a tissue, or a cell of a living body, or a part thereof is an observation target object 15. Then, a scanner apparatus (not shown) having a function of the optical microscope reads the observation target object 15 stored in a glass slide, to obtain a digital image and store digital image obtained into the scanner apparatus or another storage apparatus.

The scanner apparatus or a general-purpose computer (not shown) generates, as shown in FIG. 3, from the largest whole image obtained as described above, a plurality of whole images whose resolutions are reduced stepwise, and stores those images in unit of "tile" that is a unit of a predetermined size, for example. The size of one tile is 256×256 (pixel), for example. The image group generated as described above forms the image pyramid structure 50 such that a plurality of tiers are aligned in the order of resolutions, a plurality of image pyramid structures 50 are formed for each different observation target object, and the storage unit 108 of the PC 100 stores the image pyramid structures 50. The PC 100 only has to store the whole images whose resolutions are different with the whole images being associated with resolution information items, respectively. It should be noted that the generating and storing the image pyramid structure 50 may be performed by the PC 100 shown in FIG. 1.

The PC 100 uses software that employs the system of the image pyramid structure 50, to extract a plurality of tiles corresponding to the display range D from a whole image of an arbitrary resolution in the image pyramid structure 50 in accordance with an input operation through the input unit 107 by a user. Then, the PC 100 reads the extracted tiles in the RAM 103, and, after that, outputs the tiles as a partial image to the display unit 106. Further, in a case where a move (scroll) operation is input with respect to the displayed partial image by a user, the PC 100 moves (scrolls) the display range D on a whole image from which the partial image is extracted, and extracts a plurality of tiles included in the display range D having been moved to output the tiles. Further, in a case where a zoom operation is input with respect to the displayed partial image by a user, the PC 100 extracts a plurality of tiles corresponding to a wide-range image or a narrow-range image of the partial image from a whole image whose resolution (tier) is different from a whole image from which the partial image is extracted, and outputs the extracted tiles as a new partial image. That is, each whole image serves as a mipmap image. With this operation, the user can get a feeling of observing the observation target object 15 while changing the observation area and the observation magnification. That is, the PC 100 functions as a virtual microscope. A virtual observation magnification in this case corresponds to a resolution in reality.

Herein, the display range D does not mean the size of the largest display range of the display unit 106. The display range D is the entire display range of the display unit 106 or a part of the entire display range. The display range D can be arbitrarily set through a setting by a user. Further, the display range D corresponds to an area of a plurality of rows×a plurality of columns of the tiles. That is, the partial image is formed of a plurality of tiles.

Further, in this example embodiment, in the image pyramid structure 50, with respect to a partial image extracted from a whole image of a predetermined resolution, an image of a range same as the range of the partial image is extracted from a whole image (whole image in an upper tier) having a predetermined resolution (reduction ratio) lower than the resolution of the whole image, to generate a thumbnail image of the partial image. Also, the PC 100 can display a list of thumbnail images of a plurality of partial images of different observation target objects (described later).

Further, in this example embodiment, in a case where the resolution (size) of the display range D is the same as the resolution (size) of the whole image, the whole image has a function same as the function of the partial image. In this case, a thumbnail image is generated with respect to the whole image. That is, a partial image may not correspond to a part of a whole image, but may correspond to the entire whole image.

[Operation of an Example Information Processing Apparatus]

Next, operations of the PC 100 as structured above will be described. In the following description, a partial image being an original image of a thumbnail image before reducing the size is referred to as "slide image" in contrast to the thumbnail image.

Figure 4:
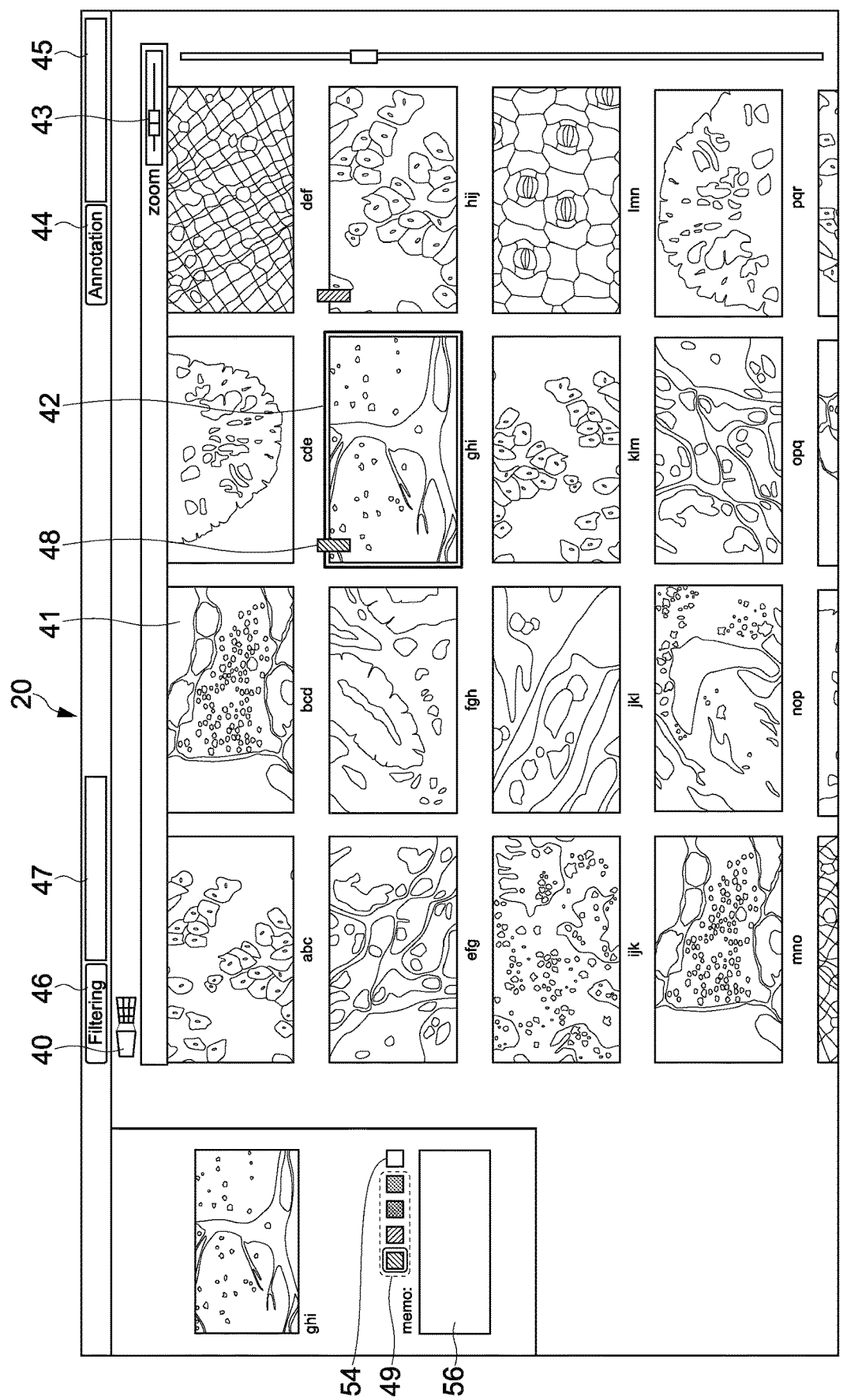
FIG. 4 is a diagram showing an example of a thumbnail list view screen according to an example embodiment of the present disclosure.
Figure 5:
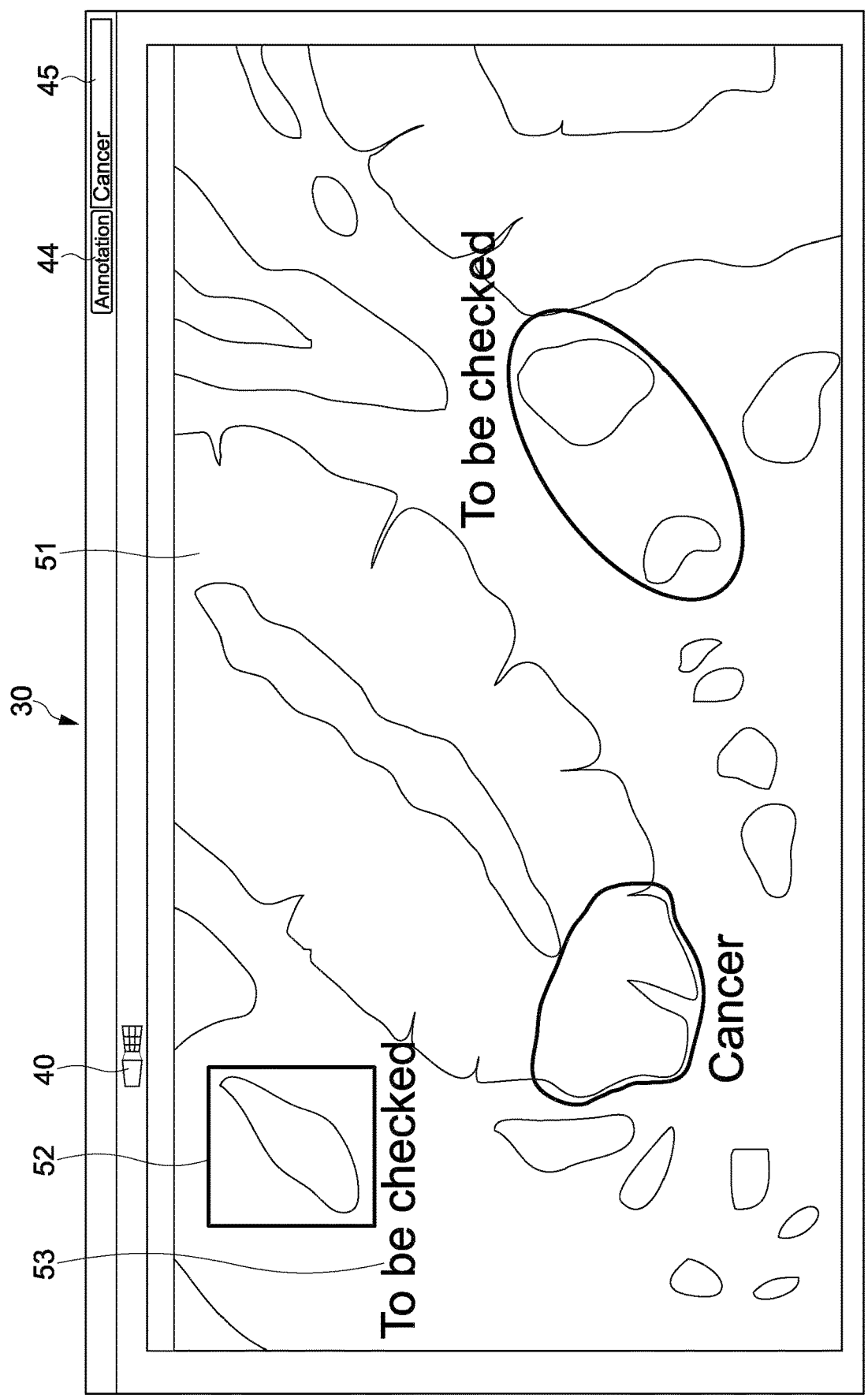
FIG. 5 is a diagram showing an example of a slide view screen according to an example embodiment of the present disclosure.

In this example embodiment, the PC 100 can switch between a view to display a display range D of one slide image (hereinafter, referred to as "slide view") and a view to display a list of thumbnail images of a plurality of slide images including the one slide image (hereinafter, referred to as "thumbnail list view"). FIG. 4 is a diagram showing an example of a thumbnail list view screen. FIG. 5 is a diagram showing an example of a slide view screen.

As shown in FIG. 4, on a thumbnail list view screen 20, a plurality of thumbnail images 41 are displayed as a list of a plurality of rows×a plurality of columns. Typically, upon activating an application for reviewing a slide image in the PC 100, the thumbnail list view screen 20 is displayed first. Below each thumbnail image 41, a file name of the thumbnail image 41 is displayed, for example.

In the thumbnail images 41, the thumbnail image 41 being selected is surrounded by a cursor 42. In an upper-right end portion of the thumbnail list view screen 20, an annotation button 44 and an annotation input field 45 for executing annotation functions on a slide view screen (described later) are displayed. Below the annotation button 44 and the annotation input field 45, a thumbnail resize slider 43 for specifying the size of (resizing) each thumbnail image 41 on the thumbnail list view screen 20 is displayed.

Further, in an upper-left portion of the list of the thumbnail images 41, a filtering button 46 and a filtering word input field 47 are displayed. The filtering button 46 is used to filter thumbnail images 41 to which an annotation coincide with a character string input by a user is added and to display the filtered thumbnail images 41. The filtering word input field 47 is used to input the character string. Below the filtering button 46, a view switch button 40 to switch between the thumbnail list view screen 20 and the slide view screen is displayed.

Further, in this example embodiment, on the thumbnail list view screen 20, a mark (tag) can be attached to an arbitrary thumbnail image 41 by a user. On the marked thumbnail image 41, a tag image 48 is displayed in an overlapped manner. The PC 100 can display the tag images 48 with a plurality of different colors, respectively. Further, the tag image 48 once attached can be deleted by a user. In a left end portion of the thumbnail list view screen 20, color select buttons 49 and a tag delete button 54 are displayed. The color select buttons 49 are used to select colors of the tags out of four colors, for example. Further, as well as attaching the tag image 48, a memo can be input by a user. Below the color select buttons 49, a memo input field 56 to input the memo is displayed. Further, above the color select buttons 49, an image same as the thumbnail image 41 being selected is displayed.

The PC 100 stores correspondence information of the tag image 48 and the thumbnail image 41 in the storage unit 108, and displays the tag image 48 on the corresponding thumbnail image 41 after restarting an application or the PC 100 of this example embodiment. As a result, a user can always recognize the thumbnail image 41 to which the user pays attention.

As shown in FIG. 5, on a slide view screen 30, a slide image 51 being an original image of the thumbnail image 41 is displayed. The slide view screen 30 is displayed in a case where the view switch button 40 is clicked by a user while one thumbnail image 41 is surrounded by the cursor 42 on the thumbnail list view screen 20.

On the slide view screen 30, the display range D of the slide image 51 can be moved or the slide image 51 can be zoomed in or out through a drag operation of a mouse or a rotation operation of a wheel by a user. Specifically, through the drag operation, the CPU 101 moves the display range D on a whole image of a specific tier from which the slide image 51 being displayed is extracted, and generates and displays a new slide image 51 with tiles included in the display range D having been moved. Further, through the zoom operation, the CPU 101 extracts a plurality of tiles included in a display range D corresponding to a wide-range image or a narrow-range image of the slide image 51 being displayed from a whole image whose tier is different from a tier of a whole image from which the slide image 51 being displayed is extracted, and displays the extracted tiles as a new slide image 51.

Further, on the slide view screen 30, annotation information being additional information with regard to the slide image 51 being displayed can be input by a user and displayed. In a case where an arbitrary position on the slide image 51 is surrounded by a square or a circle or is underlined by a user while the annotation button 44 is being clicked, the PC 100 displays the square, the circle, or the line as annotation position information 52. In addition, in a case where an arbitrary character string is input to the annotation input field 45 by a user, the PC 100 displays the character string as annotation character information 53.

Figure 6:
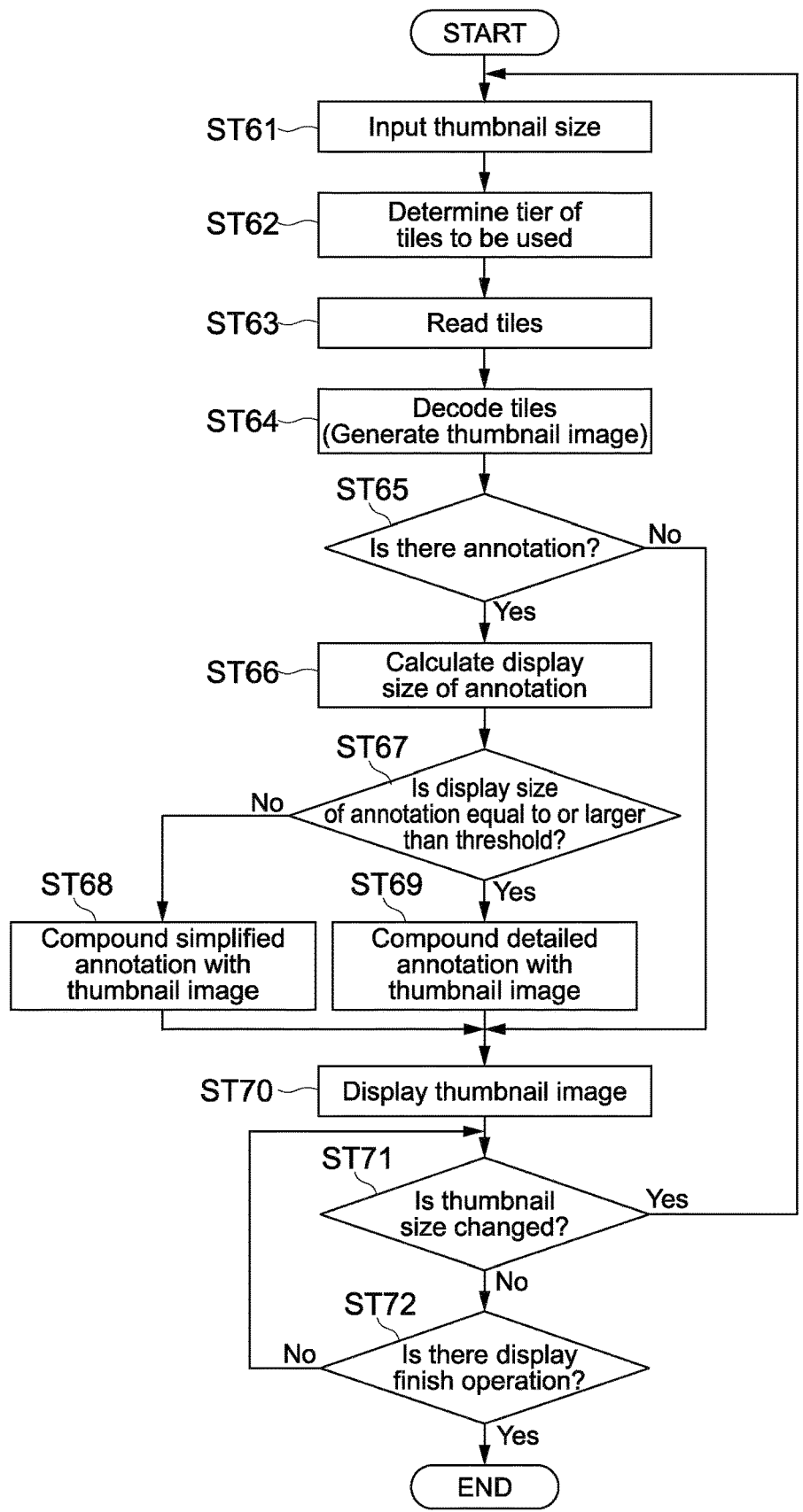
FIG. 6 is a flowchart showing an example thumbnail display processing of the PC according to an example embodiment of the present disclosure.

Next, a specific description will be given on a thumbnail display processing by the PC 100. The processing performed by the PC 100 described in the following is implemented in cooperation with software stored in the storage unit 108, the ROM 102, or the like and hardware resource of the PC 100. Specifically, the CPU 101 loads a program (application) structuring the software stored in the storage unit 108, the ROM 102, or the like on the RAM 103 and executes the program, to thereby realize the following processing. FIG. 6 is a flowchart showing the thumbnail display processing. FIG. 7 are diagrams showing a resizing processing of a thumbnail image.

As shown in FIG. 6, upon activating an application for viewing the slide image, the CPU 101 of the PC 100 inputs a size of a thumbnail image (Step 61). When the application is activated first, a predetermined size is assigned to the size of a thumbnail image.

When the size of a thumbnail image is input, the CPU 101 determines tiles of an appropriate tier out of the tiles in the image pyramid structure 50 in accordance with the input size (resolution) (Step 62). Next, the CPU 101 reads the determined tiles from the storage unit 108 in the RAM 103 (Step 63).

Next, the CPU 101 decodes the tiles read in the RAM 103 and stores the decode result in a texture buffer in the RAM 103 (Step 64). When decoding is finished, the thumbnail image 41 is generated in the texture buffer.

When the thumbnail image 41 is generated as a result of decoding of the tiles, the CPU 101 confirms if there is an annotation in relation with the slide image 51 being an original image of the thumbnail image 41 or not (Step 65). Here, the "annotation" is the annotation position information 52 and/or the annotation character information 53.

In a case where there is no annotation in relation with the slide image 51 (No in Step 65), the CPU 101 draws the texture and displays the thumbnail image 41 on the thumbnail list view screen 20 (Step 70).

In a case where there is an annotation in relation with the slide image 51 (Yes in Step 65), the CPU 101 calculates a size of an annotation on the thumbnail image 41 corresponding to a size of the annotation on the original image appropriate to a reduction ratio of the thumbnail image 41 (width or height of thumbnail image/width or height of slide image being original image thereof) (Step 66).

In a case where the size of the annotation on the thumbnail image 41 obtained by the calculation is smaller than a predetermined threshold (No in Step 67), the CPU 101 displays a simplified-display annotation on the thumbnail image 41 in an overlapped manner (Step 68). Then, the CPU 101 draws the texture and displays the thumbnail image 41 compounded with the simplified-display annotation on the thumbnail list view screen 20 (Step 70). In the simplified display, for example, the CPU 101 only displays a predetermined-sized dot on a position of the annotation position information 52 and display no annotation character information 53.

Referring back to the flowchart of FIG. 6, in a case where the size of the annotation on the thumbnail image 41 is equal to or larger than the predetermined threshold (Yes in Step 67), the CPU 101 displays a detailed-display annotation on the thumbnail image 41 in an overlapped manner (Step 69). Then, the CPU 101 draws the texture and displays the thumbnail image 41 compounded with the detailed-display annotation on the thumbnail list view screen 20 (Step 70). In the detailed display, the CPU 101 displays the annotation position information 52 and the annotation character information 53.

After that, each time the thumbnail size is changed (Yes in Step 71), the CPU 101 repeats the processing of Step 61 to Step 70. Further, in a case where an order to finish the display processing is input by a user, the CPU 101 finishes the display processing (Yes in Step 72).

Figure 7A:
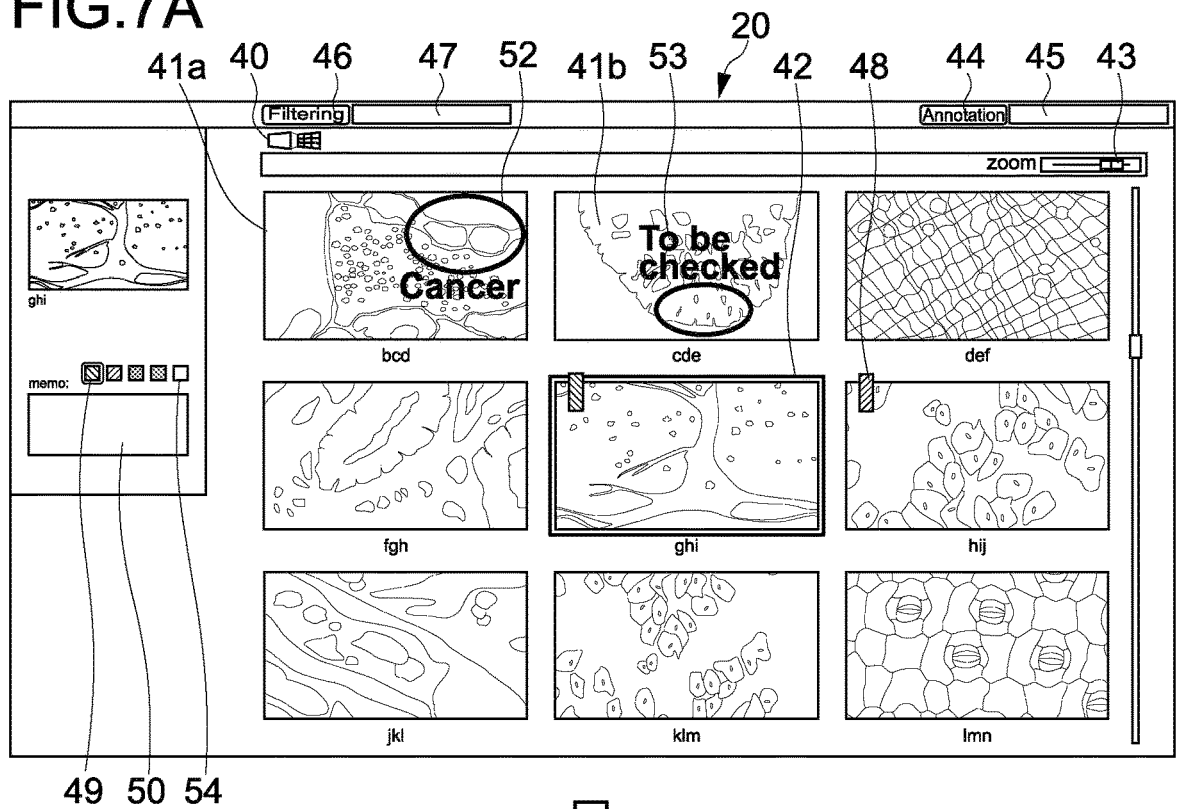
FIGS. 7A and 7B are diagrams showing an example resizing process of a thumbnail image according to an example embodiment of the present disclosure.
Figure 7B:
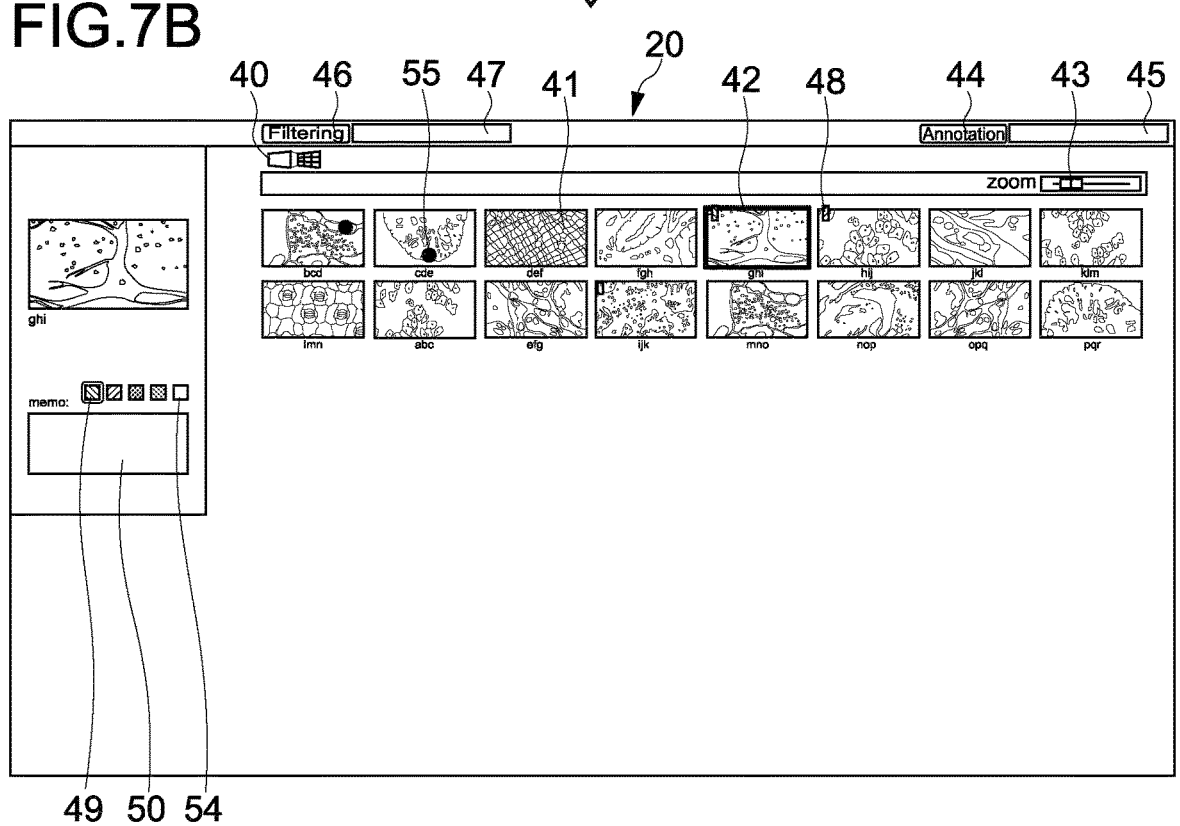

Specifically, as shown in FIG. 7A, in a case where the thumbnail resize slider 43 is moved, for example, from right to left by a user on the thumbnail list view screen 20, each of the 3 rows×3 columns of thumbnail images 41 is reduced in size as shown in FIG. 7B and the 2 rows×8 columns of thumbnail images 41 are displayed. Further, FIG. 7B shows a case where the size of the reduced-size thumbnail image 41 is smaller than the predetermined threshold. That is, in FIG. 7A, the annotation position information 52 and the annotation character information 53 are displayed on the thumbnail images 41a and 41b as the annotation information. As a result of reducing the size, as shown in FIG. 7B, only annotation dot information 55 is displayed on the thumbnail images 41a and 41b instead of the annotation position information 52 and the annotation character information 53.

As described above, in the case where the thumbnail image 41 is reduced in size, only the annotation dot information 55 showing the position of the annotation is displayed out of the annotation. So the PC 100 can prevent visibility of the thumbnail image 41 itself from being adversely affected caused by the annotation character information 53 overlapped with the reduced-size thumbnail image. Specifically, in analyzing a pathological diagnosis image, operations required to a diagnosis by a pathologist is further facilitated. That is, the PC 100 is capable of changing the size of the thumbnail image 41 and dynamically changing display modes of the annotation information being metadata displayed in the overlapped manner, to thereby further facilitate the diagnosis operation by a pathologist or the like. Further, the annotation position information 52 of a square, a circle, or the like is only displayed as a dot, so an arithmetic amount of the CPU 101 is reduced.

As described above, in this example embodiment, the CPU 101 can filter only the thumbnail images 41 including a predetermined character string as the annotation character information 53, and display only the filtered thumbnail images 41 on the thumbnail list view screen 20. FIG. 8 are diagrams showing the filtering processing.

Figure 8A:
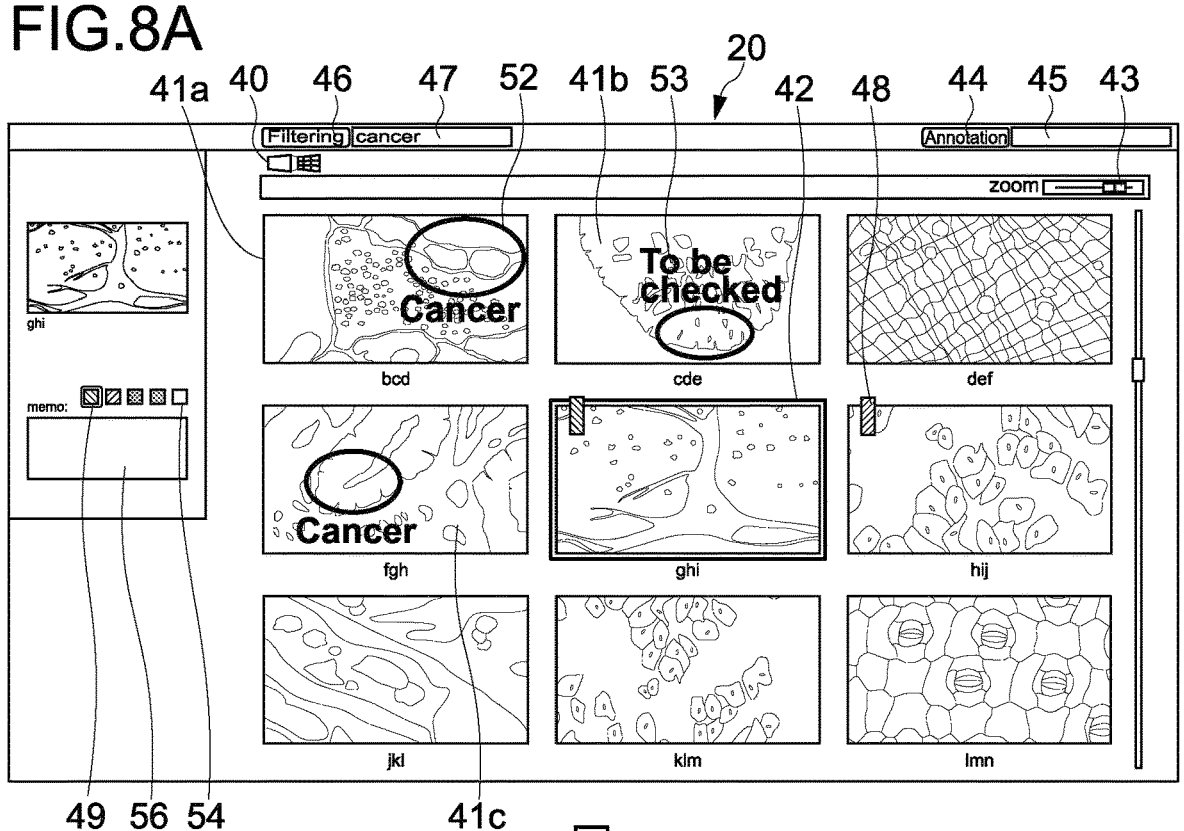
FIGS. 8A and 8B are diagrams showing an example filtering processing of a thumbnail image based on a character string according to an example embodiment of the present disclosure.
Figure 8B:
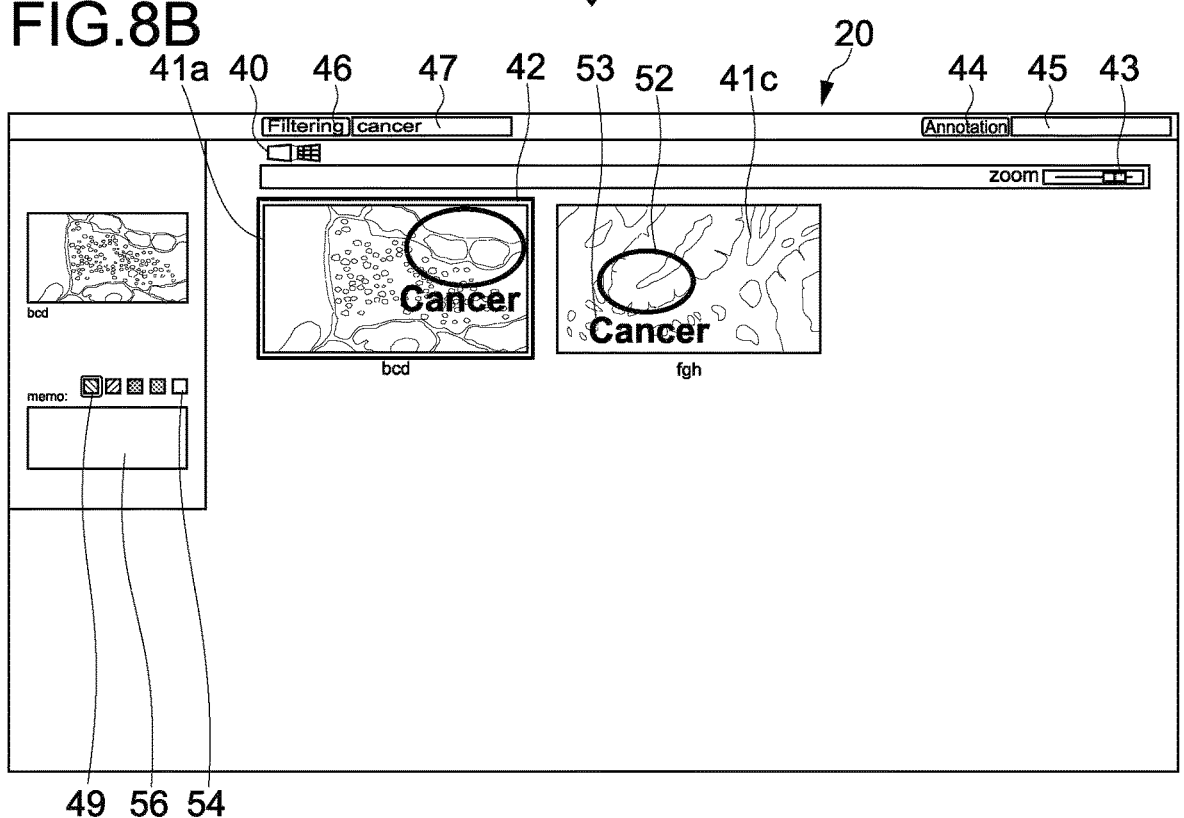

As shown in FIG. 8A, in a case where, for example, a character string "Cancer" is input in the filtering word input field 47 and the filtering button 46 is clicked, the CPU 101 filters only the thumbnail images 41a and 41c having the character string "Cancer" as the annotation character information 53, and displays only the thumbnail images 41a and 41c on the thumbnail list view screen 20. For example, in FIG. 8A, the thumbnail image 41b has the annotation character information 53 "To be checked". As shown in FIG. 8B, after filtering, the thumbnail image 41b is not displayed.

Through this processing, a user can selectively view only the thumbnail image 41 corresponding to a desired character string. Further, in a case where the size of the thumbnail image 41 is smaller than the predetermined threshold and the annotation character information 53 is not displayed on the thumbnail image 41 in the overlapped manner, a user can view the thumbnail image 41 in relation with the input character string without confirming the correspondence relationship between the annotation character information 53 and the thumbnail image 41.

As described above, in this example embodiment, the PC 100 can switch between the thumbnail list view screen 20 and the slide view screen 30 to be displayed. On the slide view screen 30, as described above, the move operation and the zoom operation are capable of being performed. In this example embodiment, the PC 100 can update the thumbnail image 41 on the thumbnail list view screen 20 in a manner that history information of the move operation and the zoom operation is reflected. Hereinafter, a description will be given on an update operation of the thumbnail image 41 using the operation history information.

Figure 9:
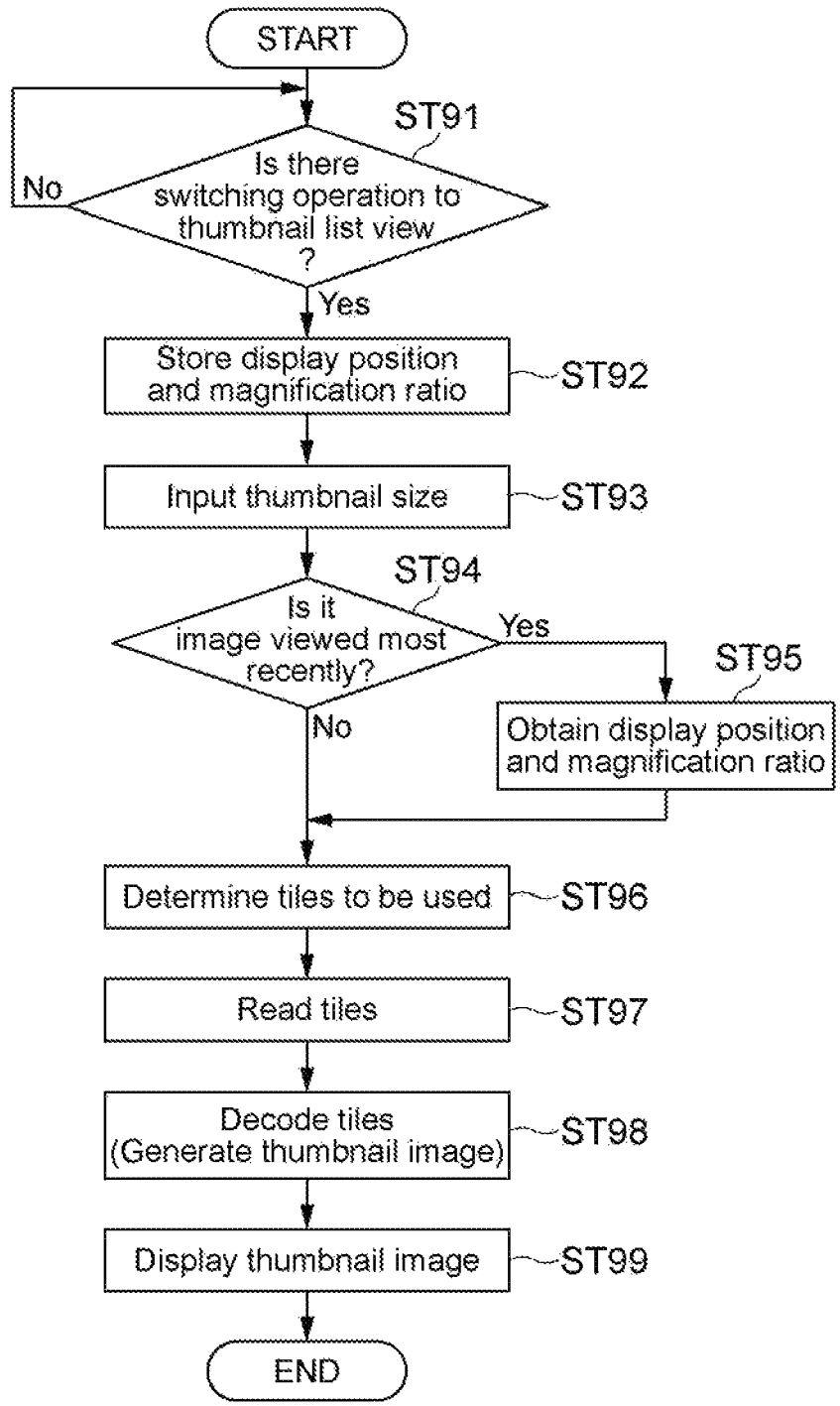
FIG. 9 is a flowchart showing an example reflecting process of the operation history of the PC to the thumbnail image according to an example embodiment of the present disclosure.

FIG. 9 is a flowchart showing an update processing of the thumbnail image 41. FIG. 10 are diagrams showing the update processing.

As shown in FIG. 9, the CPU 101 determines if a switching operation to the thumbnail list view screen 20 is input or not on the slide view screen 30 (Step 91). In a case where the switching operation is input (Yes in Step 91), the CPU 101 stores a display position (position in whole image) and a magnification ratio (tier of whole image) of the slide image 51 being displayed in the RAM 103 (Step 92).

Then, the CPU 101 inputs the size of each thumbnail image 41 in order to switch from the slide view screen 30 to the thumbnail list view screen 20 (Step 93). This size is a size assigned on the last thumbnail list view screen 20, for example.

After that, the CPU 101 determines if an original image of each thumbnail image 41 to be generated is the slide image 51 displayed on the last slide view screen 30 or not (Step 94). In a case where the CPU 101 determines the original image of the thumbnail image 41 is the image displayed most recently (Yes in Step 94), the CPU 101 obtains a display position and a magnification ratio of the slide image 51 on the slide view screen 30 from the RAM 103 (Step 95).

Next, the CPU 101 determines tiles to be used for each of the thumbnail images 41 including the thumbnail image 41 of the slide image 51 viewed most recently from the tile data in the image pyramid structure 50 based on the size of the thumbnail image 41 and the display position and the magnification ratio of the last slide image 51 (Step 96).

After the tiles to be used for the thumbnail images 41 are determined, similar to the processing of Step 63, Step 64, and Step 70 of FIG. 6, the CPU 101 reads the tile data, decodes the read tile data, and displays the decode result images as the thumbnail images 41 (Steps 97-99).

As shown in FIG. 10, with regard to the slide image 51 corresponding to one thumbnail image 41 (FIG. 10A) selected on the thumbnail list view screen 20, a zoom operation is performed on the slide view screen 30 (FIG. 10B to FIG. 10C). After that, in a case where the slide view screen 30 is switched to the thumbnail list view screen 20 (FIG. 10C to FIG. 10D), the CPU 101 reflects the magnification ratio of the zoom operation to the thumbnail image 41 corresponding to the slide image 51 and displays the thumbnail list view screen 20 (FIG. 10D).

According to the above-mentioned processing, a user can easily understand which thumbnail image 41 on the thumbnail list view screen 20 after switching corresponds to the slide image 51 with respect to which an operation is performed most recently.

Modified Example

It should be understood by those skilled in the art that various modifications, combinations, sub-combinations and alterations may occur depending on design requirements and other factors insofar as they are within the scope of the appended claims or the equivalents thereof.

In the above-mentioned example embodiment, as metadata of the slide image 51, the annotation information is used and displayed on the thumbnail image 41 in the overlapped manner. However, as metadata instead of the annotation information, characteristic identification data for identifying characteristics of each of a plurality of areas of the slide image 51 may be used. That is, the PC 100 detects characteristics of each area of the slide image 51 based on, for example, a frequency component, a standard deviation, a contrast, an edge, and the like of a clustering processing of the slide image 51, or performs cluster processing with regard to each of the characteristics, to thereby generate characteristic data for each area. Then, the PC 100 may store the characteristic identification data for identifying the characteristic data in the RAM 103, and may display the characteristic identification data on the thumbnail image 41 in an overlapped manner such that display modes of the characteristic identification data are different in each characteristic area. For example, the PC 100 makes brightness or color of each area different from one another, to thereby emphasize a specific area in the thumbnail image 41 and distinguish each area from one another.

Further, the PC 100 may extract a partial range having specific characteristics from the thumbnail image 41 in accordance with a position or a size of the range, and may generate the extracted data as the thumbnail image 41 to display the extracted data. Specifically, the PC 100 extracts tiles corresponding to the specific range from a whole image of an appropriate tier, decodes the tiles, and displays the tiles as the thumbnail image 41.

With this processing, a user can recognize each characteristic area of the original image of each thumbnail image 41 on the thumbnail list view screen 20 at a glance. Specifically, in analyzing a pathological diagnosis image, a pathologist can view only the list of areas required to a diagnosis. So operations required to a diagnosis is performed with higher efficiency. Further, in a case where only the characteristic area is extracted and displayed, a user can view the characteristic area at higher resolution, and a pathological diagnosis is performed with higher efficiency.

In the above-mentioned example embodiment, the mode is described in which the image data (tiles) that forms the image pyramid structure 50 is stored in the storage unit 108 of the PC 100. However, instead of the PC 100, another computer or a server may store the image data that forms the image pyramid structure 50, and the PC 100 used by a user as a terminal apparatus may access the computer or the server to receive the image data. In this case, the PC 100 as the terminal apparatus and the server or the like may be connected via a network such as a LAN and a WAN. In particular, the use of the WAN can realize telepathology, telediagnosis, or the like.

In the above-mentioned example embodiment, the thumbnail image 41 of each slide image 51 of different observation target object 15 is generated, and the thumbnail images 41 are displayed as a list. Instead, a plurality of thumbnail images 41 of one observation target object 15 whose position and magnification are different from one another may be generated and displayed as a list. In this case, similar to the above-mentioned example embodiment, various processing to change a size of the thumbnail image 41, to switch the view, and the like is executed.

In the above, the mode is described in which, as the original image of the image pyramid structure 50, one original image is generated with respect to the one observation target object 15. However, with respect to the one observation target object 15, a plurality of original images may be generated in the thickness direction of the observation target object 15 which is a focus direction of the optical microscope. This is called Z-stack, which is a function to deal with the case where tissues or cells may have different shapes also in the thickness direction of the observation target object 15. The scanner apparatus has the Z-stack function in many cases, and about 5 to 10 or 10 to 30 original images are generated. In this case, thumbnails may be generated with respect to a plurality of images at different focuses of one observation target object, and the thumbnails may be displayed as a list of thumbnail images similar to the above-mentioned example embodiment. In this case, similar to the above-mentioned example embodiment, various processing to change a size of the thumbnail image 41, to switch the view, and the like is executed.

The PC is used as the information processing apparatus according to the above example embodiment, but a dedicated information processing apparatus may be used instead of the PC. Further, the information processing apparatus is not limited to an apparatus that implements the above-described information processing in cooperation with the hardware resource and the software. Dedicated hardware may implement the above-described information processing.

It should be understood that various changes and modifications to the presently preferred example embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus comprising: circuitry configured to:
receive an image request which includes a particular region of a stored image and a particular resolution for the requested image;
cause a display device to display the requested image data and a first visual indication data based on coordinates of annotation data associated with the requested region of the storage image in a case that a display size of the annotation data is equal or larger than a predetermined size; and
cause the display device to display the requested image data and a second visual indication data based on the coordinates of the annotation data in a case that the display size of the annotation data is smaller than the predetermined size, wherein both a size and a form of the second visual indication data is different from the first indication visual data in that the form is a predetermined shape smaller than the predetermined size on a reduced-size thumbnail image of an original image.

2. The information processing apparatus of claim 1, wherein the stored image is at least one of a medical image, a pathological image and a biological image.

3. The information processing apparatus of claim 1, wherein the stored image is a pathological image of at least a part of biological tissue.

4. The information processing apparatus of claim 1, wherein the stored image is an image of a cell, a tissue, or an organ.

5. The information processing apparatus of claim 1, wherein the stored image has a pyramid structure.

6. The information processing apparatus of claim 1, wherein the annotation data is at least one of an image, a figure, or text.

7. The information processing apparatus of claim 1, wherein the requested image data is a thumbnail image.

8. The information processing apparatus of claim 1, wherein the circuitry is further configured to determine that the requested region of the stored image has the annotation data or not.

9. An image processing method comprising:
receiving an image request which includes a particular region of a stored image and a particular resolution for the requested image;
causing a display device to display the requested image data and a first visual indication data based on coordinates of annotation data associated with the requested region of the storage image in a case that a display size of the annotation data is equal or larger than a predetermined size; and
causing the display device to display the requested image data and a second visual indication data based on the coordinates of the annotation data in a case that the display size of the annotation data is smaller than the predetermined size, wherein both a size and a form of the second visual indication data is different from the first indication visual data in that the form is a predetermined shape smaller than the predetermined size on a reduced-size thumbnail image of an original image.

10. The image processing method of claim 9, wherein the stored image is at least one of a medical image, a pathological image and a biological image.

11. The image processing method of claim 9, wherein the stored image is a pathological image of at least a part of biological tissue.

12. The image processing method of claim 9, wherein the stored image is an image of a cell, a tissue, or an organ.

13. The image processing method of claim 9, wherein the stored image has a pyramid structure.

14. The image processing method of claim 9, wherein the annotation data is at least one of an image, a figure, or text.

15. The image processing method of claim 9, wherein the requested image data is a thumbnail image.

16. The image processing method of claim 9, further comprising determining that the requested region of the stored image has the annotation data or not.

17. A method for viewing, on a client viewer, image data stored in a memory on an image server, wherein a stored image includes image data at a plurality of resolutions and annotation data, the method comprising:
receiving, at the image server, an image request from the client viewer which includes a particular region of a stored image and a particular resolution for the requested image;
providing the requested image data and a first visual indication data on a display of the client viewer in a case that a display size of annotation data, which is associated with the requested region of the storage image, is equal or larger than a predetermined size, wherein the first visual indication data is based on coordinates of the annotation data; and
providing the requested image data and a second visual indication data on the display of the client viewer in a case that the display size of the annotation data is smaller than the predetermined size, wherein the second visual indication data is based on the coordinates of the annotation data, wherein both a size and a form of the second visual indication data is different from the first indication visual data in that the form is a predetermined shape smaller than the predetermined size on a reduced-size thumbnail image of an original image.

* * * * *